No. 661,273. Patented Nov. 6, 1900.
J. PARK.
BAKER'S PAN.
(Application filed Nov. 2, 1898.)
(No Model.)
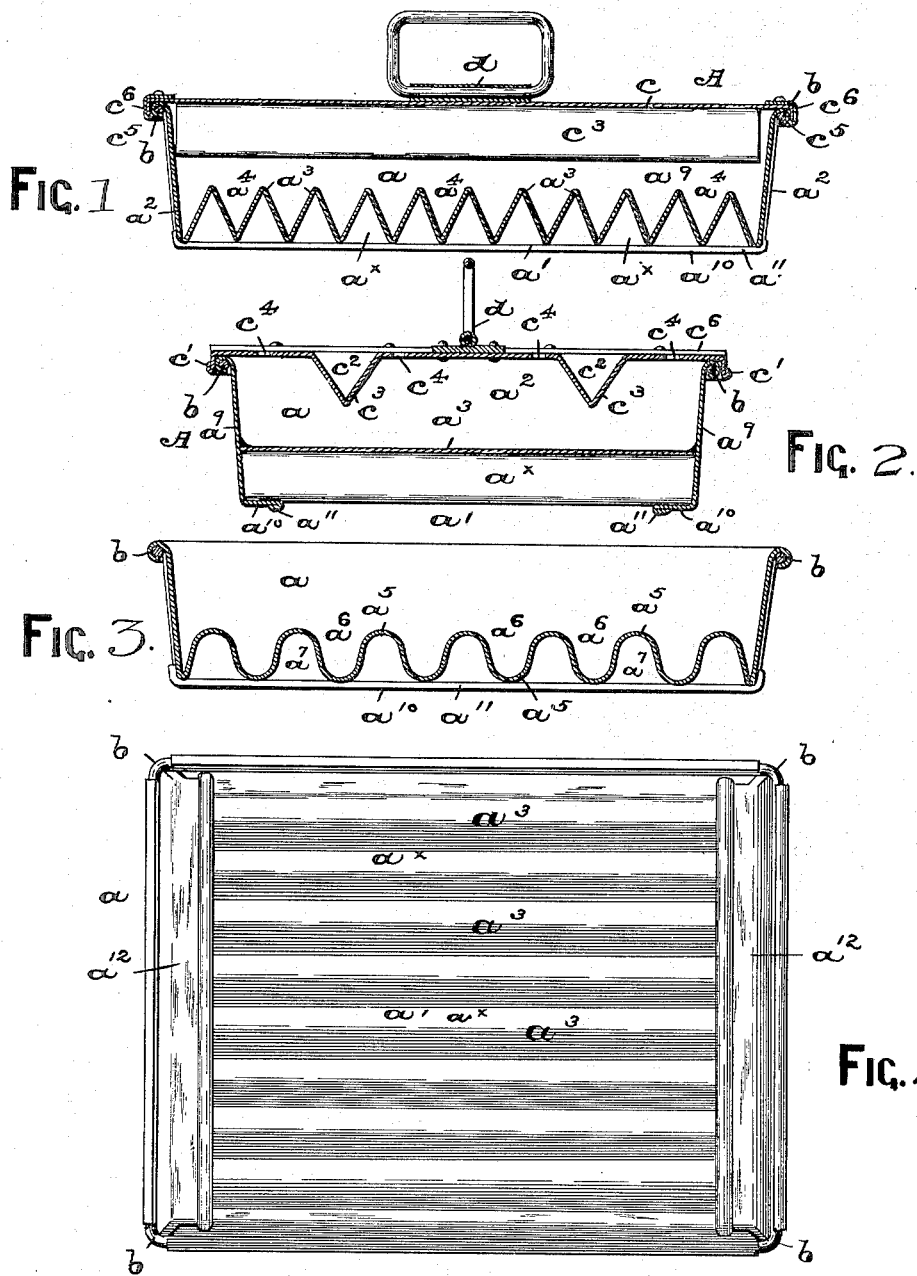
WITNESSES:
Wm. H. Canfield, Jr.
Walter H. Talmage.
INVENTOR:
JAMES PARK,
BY
Fred L. Fraentzel,
ATTORNEY.

UNITED STATES PATENT OFFICE.

JAMES PARK, OF NEWARK, NEW JERSEY.

BAKER'S PAN.

SPECIFICATION forming part of Letters Patent No. 661,273, dated November 6, 1900.

Application filed November 2, 1898. Serial No. 695,276. (No model.)

*To all whom it may concern:*

Be it known that I, JAMES PARK, a citizen of the United States, residing at Newark, in the county of Essex and State of New Jersey, have invented certain new and useful Improvements in Bakers' Pans; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to improvements in pans for the baking of bread, cake, &c.; and the invention has for its primary object to provide a simple, strong, and serviceable pan of the construction hereinafter more fully set forth for the baking of bread or the like in order to provide the baked loaf with a larger crust-surface than heretofore, and thereby rendering the bread or cake more palatable.

A further object of the invention is to provide a pan of the character and for the purposes to be hereinafter fully specified which shall be positive and effective when in use and in which bread can be baked in less time and more thoroughly than is now generally the case.

The invention therefore consists in the novel construction of baker's pan hereinafter set forth and also in such novel arrangements and combinations of the several parts, as well as in the details of the construction thereof, all of which will be fully described in the following specification and finally embodied in the clauses of the claim.

The invention is fully illustrated in the accompanying drawings, in which—

Figure 1 is a sectional view of the pan; and Fig. 2 is a cross-section of the pan, taken in a plane at right angles to the plane of section in Fig. 1. Fig. 3 is a sectional view of a pan of a slightly-modified form of construction, and Fig. 4 is a bottom view of a pan in which the channels or depressions in the bottom of the pan extend in opposite directions from those illustrated in the construction represented in said Fig. 1.

Similar letters of reference are employed in all of the above-described views to indicate corresponding parts.

In said drawings, A indicates my novel form of baker's pan, the same comprising a body $a$ and a removable cover $c$. As will be seen from an inspection of Figs. 1 and 2, the bottom $a'$ and sides $a^2$ of the body of the pan are preferably made in one piece, and the bottom is made serrated or zigzag in cross-section on account of certain V-shaped portions $a^3$, which extend laterally from side to side of the body and form the V-shaped channels or grooves $a^4$ within the body of the pan and the V-shaped channels or grooves $a^\times$ upon the bottom and outer surface of said body. Said portions $a^3$, however, may be of any other desirable configuration, and said bottom $a'$ may have a corrugated surface $a^5$, as indicated in Fig. 3, whereby the semicircular depressions or grooves $a^6$ and $a^7$ are provided, or said depressions or channels may be of any other desired shape in cross-section or they may run longitudinally along the entire length of the bottom $a'$, as indicated in Fig. 4. The longitudinal sides $a^9$ of the body $a$ lap over the edges of the sides $a^2$ and are secured thereto in any well-known manner; but each side $a^9$ is provided at the bottom with a ledge $a^{10}$, which is preferably beaded, as at $a^{11}$, and laps over upon the ends of said V-shaped portions $a^3$ or said corrugations $a^5$ and is secured thereon in any well-known manner. When the portions $a^3$ and corresponding depressions extend longitudinally, as in Fig. 4, then the sides $a^2$ are provided with ledges $a^{12}$, similar to the ledges $a^{10}$, and the bottom and sides $a^9$ are formed in one piece. The upper marginal edge of each side of the body is beaded around a strengthening wire or band $b$ in the usual and well-known manner.

The cover $c$ hereinabove mentioned is provided with the usual marginal bead $c'$ and is provided with one or more inwardly-extending V-shaped portions $c^3$, whereby the channels or depressions $c^2$ (illustrated in Figs. 1 and 2 of the drawings) will be provided. The cover may also be provided with a series of holes or perforations $c^4$ for the escape of the moisture and steam from within the pan when in use. The edges $c^5$ of the cover $c$ are strengthened by separate pieces $c^6$ of sheet metal, which are bent to form a part of the marginal bead of the cover and are secured to the cover by means of pins or rivets or in any other well-known manner.

From the above description it will be seen that I have devised a simple and efficient construction of pan for the baking of bread, cake, or the like which offers an increased area of browning-surface for producing crust.

By the arrangement of the transverse grooves in the body of the pan, combined with a cover having a longitudinally-arranged groove, the said variously-arranged grooves extending to near the center of the body of the pan, it will be evident that the heat in the oven will more readily penetrate the center of the mass of dough, and hence bakes the loaf thoroughly. Furthermore, the transverse grooves are spaced to enable the slicing of the loaf between each groove into ⌒-shaped slices, and the longitudinal depression in the loaf which is formed by the longitudinal groove in the cover of the pan allows, aside of the advantage of thoroughly baked bread, the breaking of the slice into small halves at the table.

I am fully aware that changes may be made in the several arrangements and combinations of the various parts, as well as in the minor details of the construction thereof, without departing from the scope of my present invention. Hence I do not limit my invention to the exact arrangements and combinations of the parts as herein shown and described nor to the exact details of the construction thereof.

Having thus described my invention, what I claim is—

1. A baker's pan for baking a single loaf, comprising a body having a transverse arrangement of channels or grooves extending upwardly to near the middle of the body of the pan, and a cover on said body provided with perforations $c^4$ for the escape of moisture or steam, having one or more longitudinally-arranged channels or grooves extending downwardly to near the center of the body of the pan, substantially as and for the purposes set forth.

2. A baker's pan comprising a body $a$ having a channeled bottom $a'$, sides $a^2$, and sides $a^9$, a ledge on each side $a^9$ overlapping a portion of said bottom $a'$, a removable cover on said body, provided with perforations $c^4$ for the escape of moisture or steam, and a longitudinally-arranged channel or channels in said cover, extending inwardly to near the center of the body of the pan, substantially as and for the purposes set forth.

3. A baker's pan comprising a body $a$ having a bottom, a series of inwardly-extending V-shaped portions $a^3$ in said bottom, forming a series of transverse and parallel channels $a^4$ and $a^\times$, and a cover on said body, provided with perforations $c^4$ for the escape of moisture or steam, and one or more inwardly-extending and longitudinally-arranged V-shaped portions in said cover, extending inwardly to near the center of the body of the pan, substantially as and for the purposes set forth.

In testimony that I claim the invention set forth above I have hereunto set my hand this 31st day of October, 1898.

JAMES PARK.

Witnesses:
 FREDK. C. FRAENTZEL,
 WALTER H. TALMAGE.